United States Patent
Ayichew et al.

(10) Patent No.: US 9,522,729 B2
(45) Date of Patent: Dec. 20, 2016

(54) FORCE COMMAND UPDATE RATE DETECTION

(71) Applicant: Goodrich Corporation, Charlotte, NC (US)

(72) Inventors: Efrem E. Ayichew, Troy, OH (US); Michael Abbott, Shelburne, VT (US)

(73) Assignee: GOODRICH CORPORATION, Charlotte, NC (US)

( * ) Notice: Subject to any disclaimer, the term of this patent is extended or adjusted under 35 U.S.C. 154(b) by 260 days.

(21) Appl. No.: 14/532,700

(22) Filed: Nov. 4, 2014

(65) Prior Publication Data

US 2016/0016660 A1    Jan. 21, 2016

Related U.S. Application Data

(60) Provisional application No. 62/026,425, filed on Jul. 18, 2014.

(51) Int. Cl.

| | | |
|---|---|---|
| *G01C 23/00* | (2006.01) | |
| *G06G 7/48* | (2006.01) | |
| *G01B 3/44* | (2006.01) | |
| *B64C 25/46* | (2006.01) | |
| *B60T 8/17* | (2006.01) | |
| *B60T 8/32* | (2006.01) | |

(52) U.S. Cl.
CPC ............ *B64C 25/46* (2013.01); *B60T 8/1703* (2013.01); *B60T 8/325* (2013.01)

(58) Field of Classification Search
USPC .................................. 701/3; 702/34; 703/13
See application file for complete search history.

(56) References Cited

U.S. PATENT DOCUMENTS

| | | | |
|---|---|---|---|
| 6,282,469 B1 * | 8/2001 | Rogers | B60R 16/0231 701/31.4 |
| 6,513,885 B1 | 2/2003 | Salamat et al. | |
| 8,195,372 B2 * | 6/2012 | Garcia | B60T 8/172 188/137 |
| 2006/0009958 A1 * | 1/2006 | Orth | G05B 9/03 703/13 |
| 2006/0206817 A1 * | 9/2006 | Jung | G06Q 99/00 715/700 |
| 2007/0006662 A1 * | 1/2007 | Giazotto | B60T 8/00 73/800 |
| 2010/0082267 A1 * | 4/2010 | Schimert | G05B 19/4065 702/34 |
| 2010/0292889 A1 * | 11/2010 | Cahill | B60T 8/1703 701/29.1 |

(Continued)

FOREIGN PATENT DOCUMENTS

| | | |
|---|---|---|
| EP | 2151363 | 2/2010 |
| GB | 1246926 | 9/1971 |

OTHER PUBLICATIONS

Extended European Search Report dated Dec. 14, 2015 in European Application No. 15177228.2.

*Primary Examiner* — Tyler Paige
(74) *Attorney, Agent, or Firm* — Snell & Wilmer, L.L.P.

(57) ABSTRACT

The present disclosure relates to rate detection components, and more particularly, to a rate detection system that determines the update rate of commands. The update rate of the commands may be determined in response to the incidence of similarities and differences among samples of the commands.

17 Claims, 6 Drawing Sheets

(56) References Cited

U.S. PATENT DOCUMENTS

2011/0226049 A1\* 9/2011 Burgess .................. G09B 9/02
                                                    73/118.01
2012/0065816 A1   3/2012 Cahill
2016/0016660 A1\* 1/2016 Ayichew ............... B60T 8/1703
                                                       701/3

\* cited by examiner

FORCE COMMAND UPDATE RATE DETECTION

CROSS REFERENCE TO RELATED APPLICATIONS

This application claims priority to and is a non-provisional of U.S. Provisional Patent Application Ser. No. 62/026,425, filed Jul. 18, 2014, and entitled "FORCE COMMAND UPDATE RATE DETECTION," which is incorporated by reference herein in its entirety.

FIELD

The present disclosure relates to rate detection components, and more particularly, to a rate detection system that determines the update rate of commands.

BACKGROUND

Aircraft brake control systems receive input signal(s) indicating desired actuator braking force/desired brake torque and transmit an output signal to a brake actuator. The input signals may be updated at different rates. For example, a brake controller may send a nominal braking signal component and may superimpose an anti-lock braking signal component on the nominal braking signal component. These two signal components may be refreshed at different rates. Thus, there is a need for a system to enable the aircraft brake control system to determine the refresh rate of one or more braking signal components.

SUMMARY

A method of force command update rate detection is disclosed. The method may include receiving, by an electrical brake actuation controller having a force command update rate detector having a variation rate detector and a similarity rate detector, a brake actuation instruction from a brake and steering control unit. The method may further include determining, by the force command update rate detector, an update rate of the brake actuation instruction; and transmitting, by the electrical brake actuation controller, a force command having a first force command update rate to an electric brake actuator in response to the determining.

A force command update rate detector is disclosed. The force command update rate detector may include a variation detector in logical communication with a signal input; and a similarity detector in logical communication with the signal input and connected in parallel with the variation detector. The variation detector may provide an output command indication including a first indication in response to the signal input receiving a first signal having a first update rate. The similarity detector may provide the output command indication including a second indication in response to the signal input receiving a second signal having a second update rate.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 4:
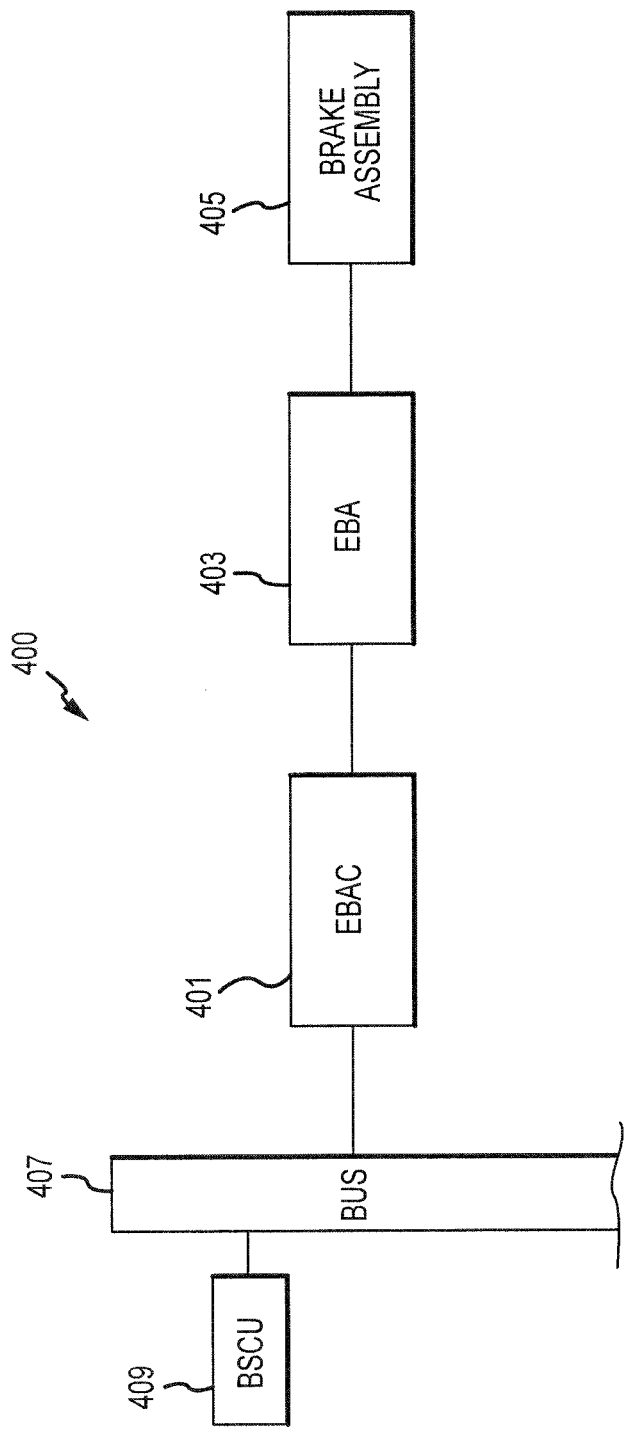
FIG. 4 depicts an example aircraft braking system wherein a force command update rate detection system may be implemented in accordance with various embodiments.
Figure 5:
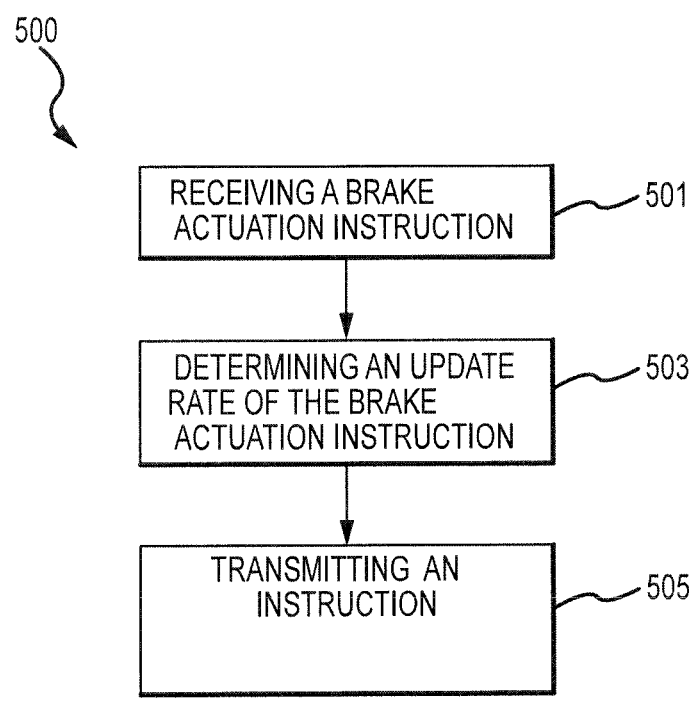
FIGS. 5-6 depict example aspects of various methods of force command update rate detection.

The present disclosure relates to a brake control system, such as an aircraft brake control system. With reference to FIG. 4, a brake control system 400 may have an electrical brake actuation controller 401 ("EBAC"), an electric brake actuator 403 ("EBA"), and a brake assembly 405. The EBAC 401 may provide force commands to the EBA 403 directing the EBA 403 to cause the brake assembly 405 to mechanically operate, moving the aircraft brakes. For example, the EBAC 401 may be responsible for executing brake actuation instructions received via a logical connection, such as a controller area network ("CAN") bus 407, from other aircraft systems, such as a brake and steering control unit 409 ("BSCU"). In this manner, the brakes may be operated.

The force command and brake actuation instructions may comprise signals from various different sources. For example, the force command and/or brake actuation instructions may be an interpretation of the pilot's brake pedal application. In various embodiments, a lookup table is employed to correlate a pedal position to a desired brake actuation state. The force command and/or brake actuation instructions may be an interpretation of auto-brake instructions corresponding to a desired aircraft deceleration rate.

During a braking event, the BSCU may superimpose a brake release command on top of the force command and/or brake actuation instructions. The brake release command may free up a locked and/or skidding wheel. For example, an anti-skid and/or anti-lock brake command may be superimposed.

However, the brake release command (such as an anti-skid and/or anti-lock brake command) may be updated at a different rate than the other force command and/or brake actuation instructions, such as a pilot braking command. It may be desired that the aircraft brakes respond very rapidly to anti-skid and/or anti-lock brake commands. Thus, it may be desired that the brake actuation state be updated very frequently. However, it may be desired that the aircraft brakes respond less rapidly during normal operation. Thus, it may be desired that the brake actuation state be updated less frequently during normal operation than during anti-skid and/or anti-lock operations.

By detecting update rate, a system may filter a brake pedal input command using filters with lower corner frequencies when the command is updated at lower update rate and abandon filtering when the signal is updated at a higher rate. Moreover, it may be desired to filter pedal inputs having a low update rate and yet a noisy signal, while it may be undesirable to filter anti-skid/anti-lock commands (due to the criticality to safe flight of the later signal). Critical signals may be updated faster than normal braking signals. Detecting the update rate could enable deciding the criticality of the command being conveyed and thereby enabling the decision on whether filtering should be applied or not. Filtering may be desired to not be applied to commands updating at a faster rate.

Furthermore, in various embodiments, by updating less rapidly during normal operations, the service life of the aircraft brakes may be enhanced. In order to ameliorate the wear experienced by the brake assembly during mechanical movements of the brakes, the brake actuation state of the aircraft brakes may be less frequently updated during normal operation.

Thus, it is advantageous to know the origin of a brake actuation instruction so that force commands that have an appropriate update rate may be provided to the brake assembly. Because anti-skid and/or anti-lock brake commands are refreshed much more rapidly than other force commands and/or brake actuation instructions, the update rate of the signal provided to the brake assembly may be selected in response to an analysis of the brake actuation instructions and/or superimposed brake release command. This is to ascertain whether an anti-skid and/or anti-lock brake command is present, and to change the update rate of the force commands provided to the brake assembly accordingly. If a signal has a rapid update rate, it is likely an anti-skid and/or anti-lock brake command, whereas if a signal has a slower update rate, it is likely a normal braking operation.

In addition, the receiving electronic item may toggle between fast and slow update rate dependent processes by autonomously identifying the update rate from the signal updated. For instance, consider the following scenario. Let a slow update rate by a source electronics item=sHz. Let a fast update rate by the source electronic item=fHz. Let an EBAC signal processing rate=bHz. Note that the EBAC may be desired to have a faster process speed than the fastest transmission rate. Thus the EBAC may process all brake actuation instructions received by an EBAC, at a EBAC processing rate faster than the fastest update rate of the brake actuation instruction. The EBAC signal processing speed may be desired to be: 1) at least larger than the least common multiple of sHz and fHz, or 2) suggested to be greater than 2 times. For example: if sHz=4 Hz and fHz=20 Hz, then b may be desired to be at least 100 Hz or integer multiple of 100 Hz.

The receiving electronic item may enter a "fast Detected" mode. In such a mode, the receiving item may process bHz/fHz (hereafter fCount) samples to recognize a signal that has been sent at fHz rate. Of the fCount values counted only fLim of the consecutive values should be dissimilar to confirm "HI RATE" mode; where fLim could be 1, 2, 3 up to fCount-1.

The receiving electronic item may exit a "fast Detected" Mode. In such a scenario, the receiving item may process bHz/sHz (hereafter sCount) samples to recognize a signal that has been sent at sHz rate. Of the sCount values counted no more than sLim of the consecutive values may be needed to be similar to confirm "LO RATE" mode; where sLim could be 1, 2, 3 up to sCount-1. With momentary reference to FIG. 1, fCount may be a dissimilarity window width 14, sCount may be a similarity window width 17, fLim may be a dissimilarity count 16 and sLim may be a similarity count 19.

As discussed herein, various aspects of the present disclosure may be implemented in various logical units of a processor having a non-transitory memory. In various embodiments, various aspects may be implemented in multiple processors and/or memories. For example, the disclosed system may be implemented within the EBAC 401. Alternatively, various aspects of the disclosed system may be implemented within the EBAC 401 and/or the EBA 403 and/or BSCU 409.

Figure 1:
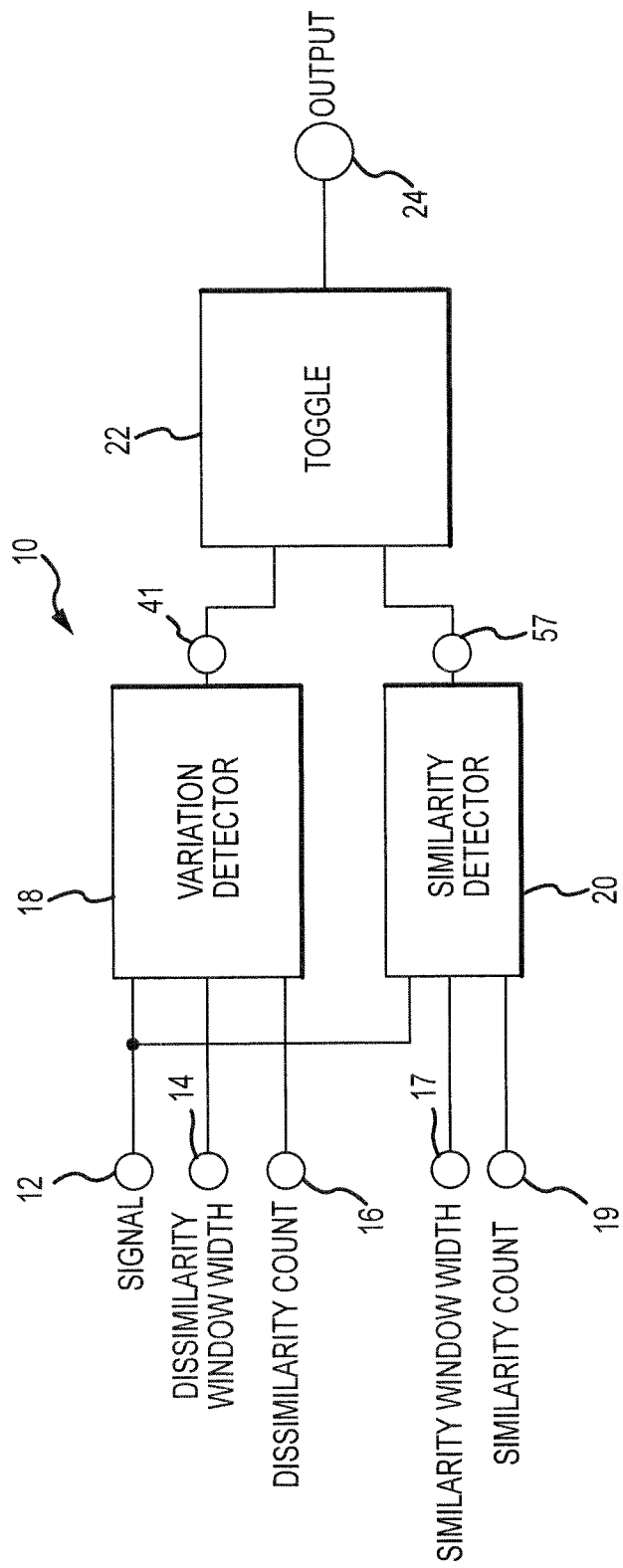
FIG. 1 depicts a block diagram overview of a force command update rate detection system in accordance with various embodiments.

With reference to FIG. 1, a force command update rate detector 10 may comprise a variation detector 18 and a similarity detector 20. The variation detector 18 and similarity detector 20 may be connected in parallel to a signal input 12, whereupon the brake actuation instructions (including any brake release command) may be communicated. The force command update rate detector 10 may provide an output command indication at output 24 in response to the brake actuation instructions. More specifically, the variation detector 18 may provide an output command indication at output 24 comprising a first rate indication in response to the signal input 12 receiving a signal having a first update rate. The similarity detector 20 may provide an output command indication comprising a second rate indication at output 24 comprising an indication that the signal input 12 is receiving a signal having a second update rate.

The variation detector 18 may further receive logical inputs comprising a dissimilarity window width 14 and a dissimilarity count 16.

Both the variation detector 18 and the similarity detector 20 may be in logical communication with a toggle 22. An output of the variation detector 18 and an output of the similarity detector 20 may be separately input into the toggle 22. In response, the toggle 22 may indicate whether the signal input 12 is receiving a signal having a first update rate (e.g., a rapid update rate ("HI RATE") (e.g., about 200 Hz)) or a second update rate (e.g., a slow update rate ("LO RATE") (e.g., about 40 Hz)). The toggle 22 may indicate that the signal input 12 is receiving a signal having a HI RATE in response to an indication from the variation detector 18. The toggle 22 may indicate that the signal input 12 is receiving a signal having a LO RATE in response to an indication from the similarity detector 20. Upon receiving an indication that the signal input 12 is receiving a signal having a HI RATE, toggle 22 may continue to provide a corresponding indication at output 24, until such time as toggle 22 receives an indication that the signal input 12 is receiving a signal having a LO RATE. Thus, it may be said that toggle 22 "latches" an output indicating a HI RATE at output 24, until a contrary indication is received.

In various embodiments, a variation detector 18 may comprise any logical detector whereby discontinuities and/or or variations in the signal provided at the signal input 12 may be identified, for instance, changes in value from one sample to another. The variation detector 18 may receive a logical input comprising a dissimilarity window width 14. The dissimilarity window width 14 may comprise a sampling period comprising a pre-determined number of samples and/or a pre-determined time period. The variation detector 18 may receive a logical input comprising a dissimilarity count 16. The dissimilarity count 16 may comprise a pre-determined numerical value. The variation detector 18 may evaluate the signal at the signal input 12. The signal at the signal input 12 may comprise a series of digital samples. The variation detector 18 may evaluate the samples to determine whether a number (k) of samples differing in value is equal to or greater than the dissimilarity count 16. If k>=the dissimilarity count 16 for each sampling period equal to dissimilarity window width 14, then the variation detector 18 signals the toggle 22 to latch an output indicating a HI RATE.

In various embodiments, a similarity detector 20 may comprise any logical detector whereby continuities and/or non-variations in the signal provided at the signal input 12 may be identified, for instance, signals that do not change in value from one sample to another. The similarity detector 20 may receive a logical input comprising a similarity window width 17. The similarity window width 17 may comprise a sampling period comprising a pre-determined number of samples and/or a pre-determined time period. The similarity detector 20 may receive a logical input comprising a similarity count 19. The similarity count 19 may comprise a pre-determined numerical value. The similarity detector 20 may evaluate the signal at the signal input 12. The signal at the signal input 12 may comprise a series of digital samples. The similarity detector 20 may evaluate the samples to determine whether a number (m) of samples is equal to or greater than the similarity count 19. If m>=the similarity count 19 for each sampling period equal to similarity window width 17, then the similarity detector 20 signals the toggle 22 to latch an output indicating a LO RATE.

As one may appreciate, in various embodiments, the similarity count 19 and the dissimilarity count 16 may add to equal the similarity window width 17 and/or dissimilarity window width 14. For example, in various embodiments, the similarity window width 17 and the dissimilarity window width 14 are equal. For instance, a signal having a sufficient number of dissimilar samples and/or dissimilar adjacent samples within a given period of time indicates that the signal contains components having a sampling rate comprising a HI RATE, for instance about 200 Hz. Moreover, a signal having a sufficient number of similar samples and/or similar adjacent samples within a given period of time indicates that the signal contains components having a sampling rate comprising a LO RATE, for instance, about 40 Hz.

Moreover, a variation detector 18 may comprise a plurality of counters, for example, a first counter and a second counter. The first counter may be triggered by detection of the first consecutive dissimilar samples received within a dissimilarity window width 14. A latch may be implemented to ensure that the first counter is not interrupted by the occurrence of consecutive similar samples. When the first counter counts a number of consecutive dissimilar samples equaling the dissimilarity window width 14, then the first counter reaches a count limit and the counter and the latch are reset to be ready for the next sampling window (per dissimilarity window width 14).

The second counter may count any consecutive dissimilar events before the dissimilarity window width 14 has expired. When the sampling window expires per dissimilarity window width 14, the counter is reset. The output of this counter is compared to the dissimilarity count 16. Upon the detection of dissimilar samples equaling or exceeding the dissimilarity count 16, a dissimilarity output 41 is triggered and passed to toggle 22.

The signal similarity counter works in a similar manner, except that the counter(s) are triggered by equal consecutive inputs rather than different consecutive inputs. A similarity detector 20 may comprise a plurality of counters, for example, a first counter and a second counter. The first counter may be triggered by detection of the first consecutive similar samples received within a similarity window width 17. A latch may be implemented to ensure that the first counter is not interrupted by the occurrence of consecutive dissimilar samples. When the first counter counts a number of consecutive similar samples equaling the similarity window width 17, then the first counter reaches a count limit and the counter and the latch are reset to be ready for the next sampling window (per similarity window width 17).

The second counter may count any consecutive similar events before the similarity window width 17 has expired. When the sampling window expires per similarity window width 17, the counter is reset. The output of this counter is compared to the similarity count 19. Upon the detection of similar samples equaling or exceeding the similarity count 19, a similarity output 57 is triggered and passed to toggle 22.

Figure 2:
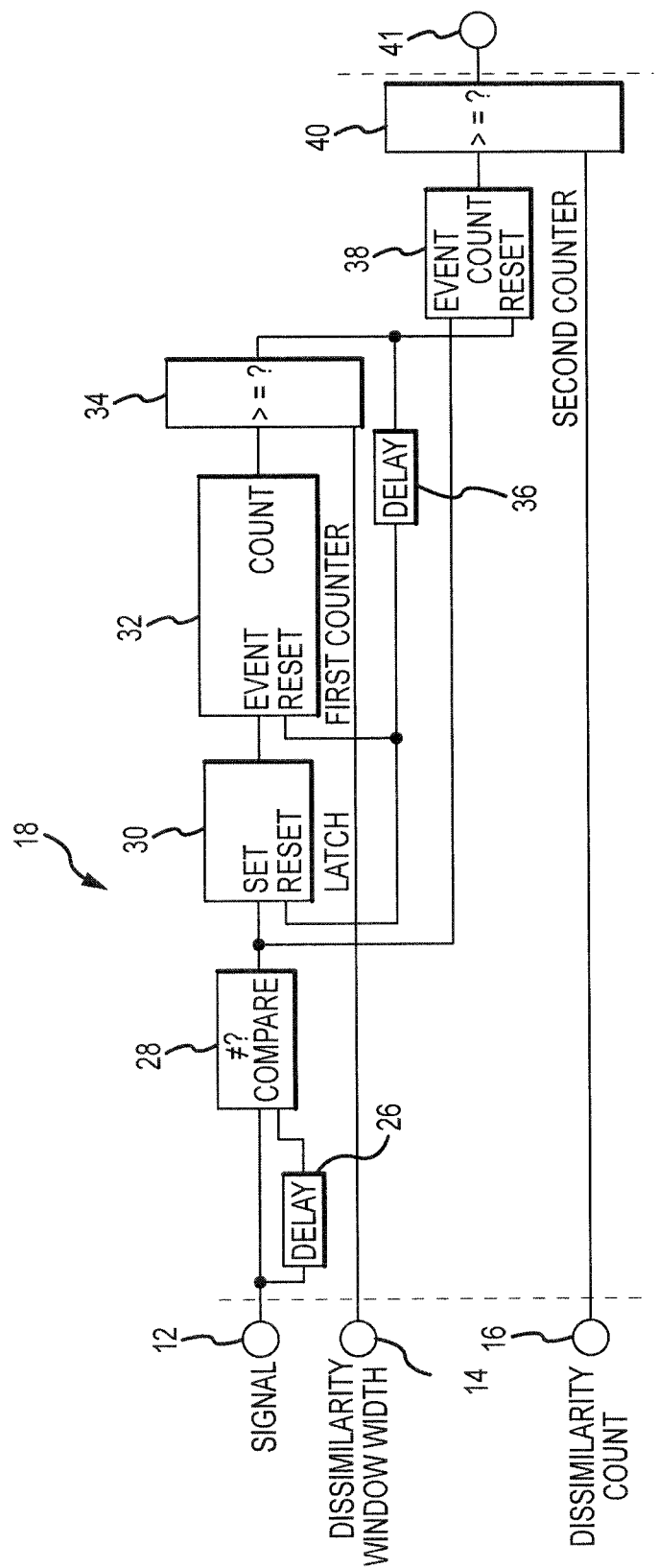
FIG. 2 depicts a detailed block diagram of a variation detector component of a force command update rate detection system in accordance with various embodiments.

Having discussed various aspects of a force command update rate detector 10, with reference to FIG. 2, an example variation detector 18 is disclosed. A variation detector 18 may include a not-equal comparator 28, which compares adjacent samples presented at signal input 12. A signal delay 26 comprising a time delay equal to a desired period, for example, the period of a single sample, may be connected to the signal input 12. The not-equal comparator 28 may be connected with one input directly connected to the signal input 12, and one input connected to the output of the signal delay 26. In this manner, the not-equal comparator 28 may determine that adjacent samples are dissimilar. However, any apparatus configured to determine that adjacent samples are dissimilar may be implemented.

The variation detector 18 may further include a latch 30. Latch 30 may trigger a first counter 32 in response to the output of the not-equal comparator 28.

The variation detector 18 may further include a first counter 32. The counter may count the number of EBAC processes elapsed since it has been triggered by latch 30, and may provide the number to a first counter greater-than comparator 34. In response to the number of times the counter has been triggered exceeding the dissimilarity window width 14, a second counter 38 (discussed below) may be reset, and the latch 30 and first counter 32 may also be reset. In various embodiments, a delay latch feedback delay 36 comprising a time delay equal to a desired period, for example, the period of a single sample, may be connected in series between the first counter greater-than comparator 34 and the reset inputs of the latch 30 and the first counter 32.

A variation detector 18 may further include a second counter 38. Latch 30 may trigger the second counter 38 in response to the output of the not-equal comparator 28, and may be reset in response to the first counter greater-than comparator 34. In this manner, second counter 38 may count the number of dissimilar samples within each dissimilarity window width 14. The output of second counter 38 may be provided to a second counter greater-than comparator 40, which compares the value to the dissimilarity count 16. In the event that the number of dissimilar adjacent samples is equal to or greater than the dissimilarity count 16, the dissimilarity output 41 is triggered by the second counter greater-than comparator 40 to indicate that variations in the sample value have occurred within the dissimilarity window width 14. In this manner, the sampling rate of the signal at signal input 12 can be determined to be above a threshold determined by the dissimilarity window width 14 and the dissimilarity count 16.

Figure 3:
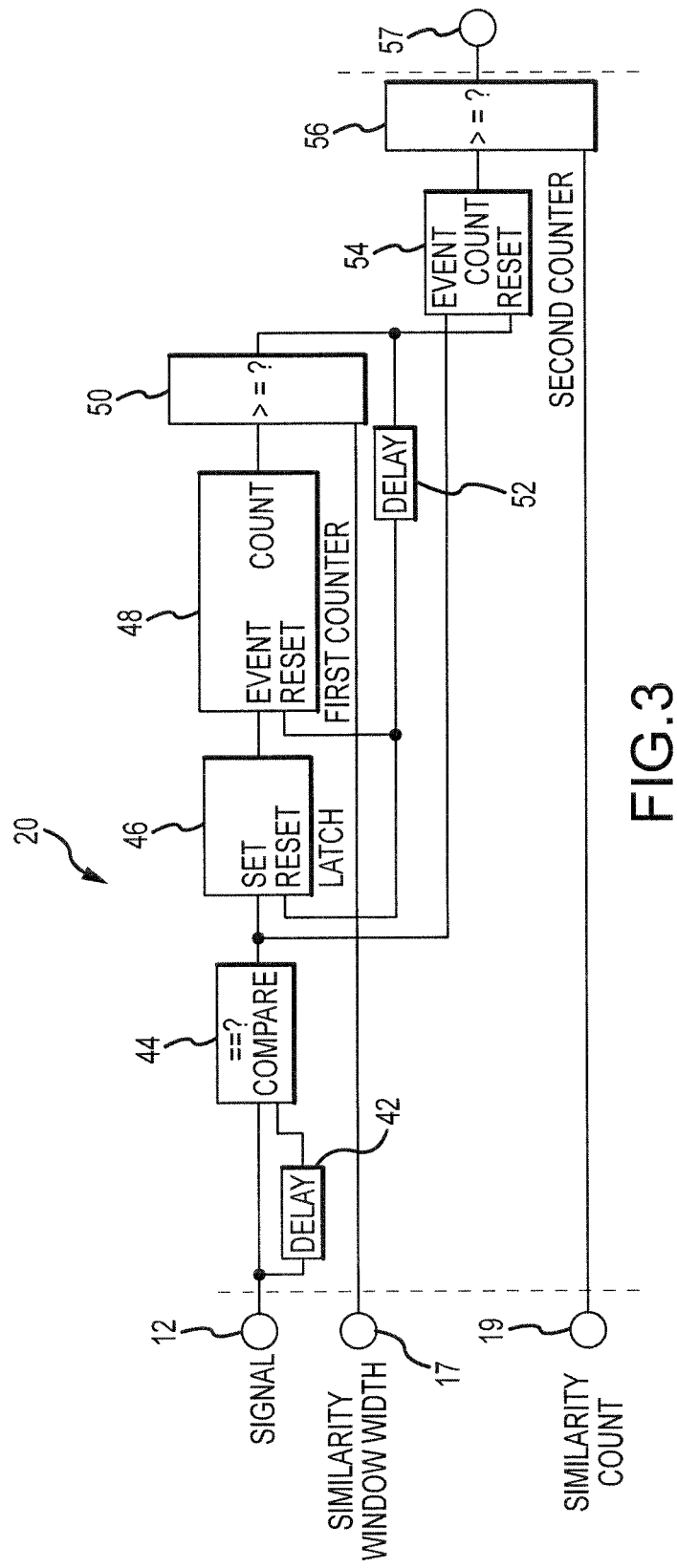
FIG. 3 depicts a detailed block diagram of a similarity detector component of a force command update rate detection system in accordance with various embodiments.

Having discussed various aspects of a force command update rate detector 10, with reference to FIG. 3, an example similarity detector 20 is disclosed. A similarity detector 20 may include an equal-to comparator 44, which compares adjacent samples presented at signal input 12. A signal delay 42 comprising a time delay equal to a desired period, for example, the period of a single sample, may be connected to the signal input 12. The equal-to comparator 44 may be connected with one input directly connected to the signal input 12, and one input connected to the output of the signal delay 42. In this manner, the equal-to comparator 44 may determine that adjacent samples are equal. However, any apparatus configured to determine that adjacent samples are equal may be implemented.

The similarity detector 20 may further include a latch 46. Latch 46 may trigger a second counter 54 in response to the output of the equal-to comparator 44.

The similarity detector 20 may further include a first counter 48. The counter may count the number of EBAC processes elapsed since it has been triggered by latch 46, and may provide the number to a first counter greater-than comparator 50. In response to the number of times the counter has been triggered exceeding the similarity window width 17, a second counter 54 (discussed below) may be reset, and the latch 46 and first counter 48 may also be reset. In various embodiments, a delay latch feedback delay 52 comprising a time delay equal to a desired period (e.g., the period of a single sample), may be connected in series between the greater-than comparator 50 and the reset inputs of the latch 46 and the first counter 48. Latch 46 may trigger the first counter 48 in response to the output of the equal-to comparator 44, and may be reset in response to the first counter greater-than comparator 50. In this manner, first counter 48 may count the number of equal samples within each similarity window width 17.

A similarity detector 20 may further include a second counter 54. Greater-than comparator 50 may trigger the second counter 54 in response to indicating that adjacent samples of signal present on signal input 12 are equal. Second counter 54 may be reset in response to the first counter greater-than comparator 50. The output of second counter 54 may be provided to a second counter greater-than comparator 56, which compares the value to the similarity count 19. In the event that the number of equal adjacent samples is equal to or greater than the similarity count 19, the similarity output 57 is triggered by the second counter greater-than comparator 56 to indicate that similarities in the sample value have occurred within the similarity window width 17. In this manner, the sampling rate of the signal at signal input 12 can be determined to be below a threshold determined by the similarity window width 17 and the similarity count 19.

A method of force command update rate detection may be provided. With reference to FIGS. 1-5, the method 500 may include receiving, by an electrical brake actuation controller 401 comprising a force command update rate detector 10, a brake actuation instruction from a BSCU 409 (Step 501). The force command update rate detector 10 may determine an update rate of the brake actuation instruction (Step 503) and may transmit an instruction (Step 505). Transmitting an instruction may comprise transmitting a first force command having a first command update rate. Moreover, transmitting an instruction may comprise transmitting an instruction to another device or an internal device to toggle between tasks that depend on update rate. For example, the instruction may include executing commands that may be enabled or disabled within EBAC 401. The instruction may include enabling or disabling a force command low pass filter. The instructions may include transmitting force commands having a command update rate to an electric brake actuator 403 in response to the determining. The brake actuation instruction and/or force commands may be a brake release command, for example during anti-skid braking operations, and/or may be a pilot braking command during normal braking. Thus the brake actuation instruction may have components with different update rates, for example, a high update rate (e.g., about 200 Hz), a low update rate (e.g., about 40 Hz), or both.

Figure 6:
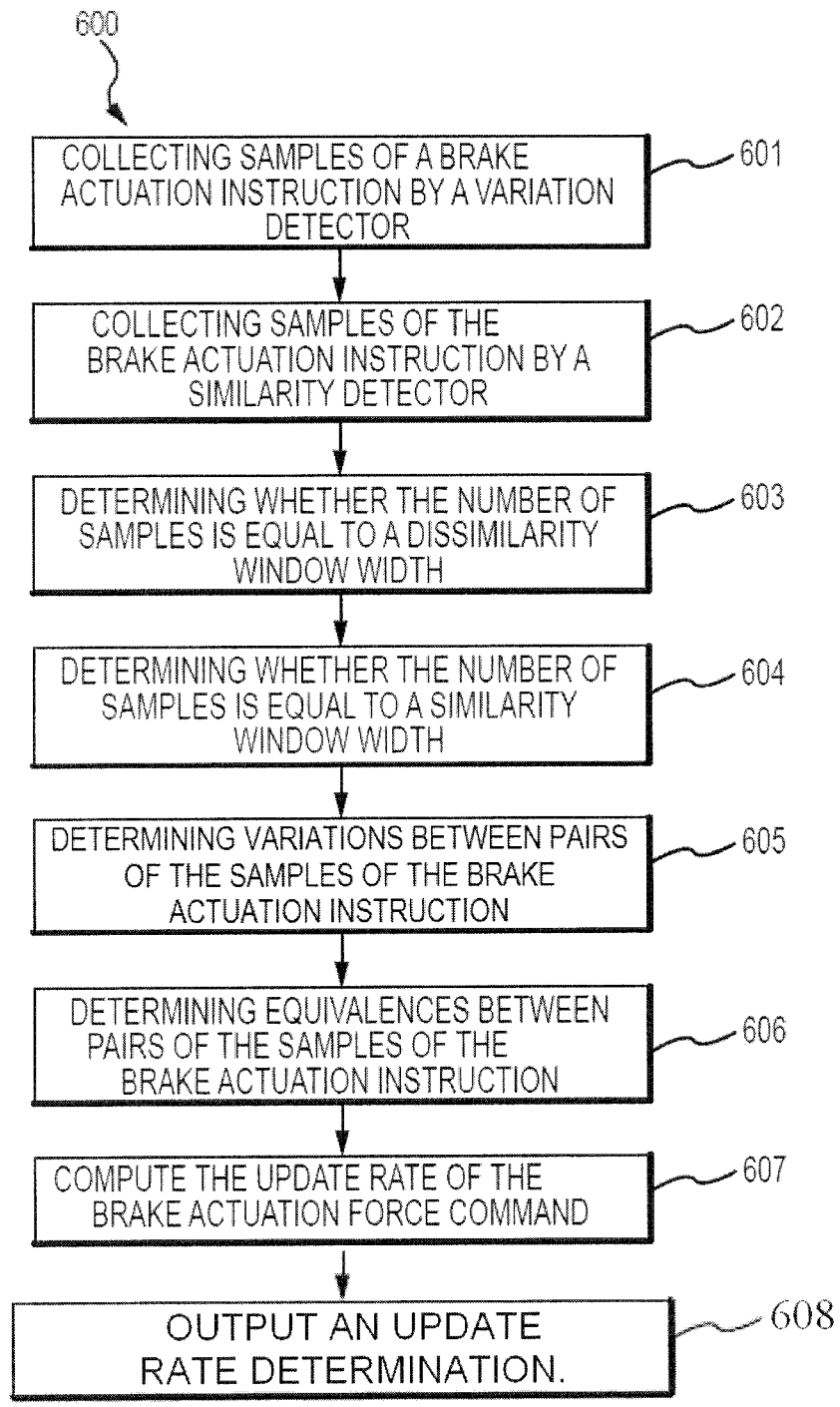

With additional reference to FIG. 6, the determining step may include a method 600 comprising substeps. For example, a variation detector 18 may collect samples of the brake actuation instruction (present at signal input 12) (Step 601). A similarity detector 20 may also collect the samples. (Step 602). The variation detector 18 may determine whether the number of samples is equal to a dissimilarity window width 14 (present at logical input) (Step 603). The similarity detector 20 may determine whether the number of samples is equal to a similarity window width 17 (present at logical input) (Step 604). The variation detector 18 may determine variations between pairs of the samples of the brake actuation instruction in response to the sampling (Step 605). Moreover, the similarity detector 20 may determine equivalences between pairs of the samples of the brake actuation instruction in response to the sampling (Step 606). The force command update rate detector 10 may utilize counters to compute the update rate of the brake actuation force command in response to the counting. (Step 607). Subsequently, an update rate determination may be output on output 24 in response to the computing (Step 608). The electrical brake actuation controller 401 may then provide force commands to an electric brake actuator 403 (see Step 505). These force commands may have an update rate equal to the update rate determination. In this manner, the force commands are sent at a lower rate during nominal operating conditions, but at a higher rate during a brake release command. This enables the wear on the brakes during nominal operating conditions to be improved, while yet maintaining the effectiveness of brake release commands.

In various embodiments, while the force command update rate detection systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, in which rate detection is desirable, for example, automobile braking systems.

The system and method may include a force command update rate used to determine the health of a remote component in a cascaded system. Such a system could comprise of a signal origination component—such as the anti-skid/anti-lock system—providing information to the system brake controller which will eventually shuttle information to the EBAC. The BSCU could transmit signal to the EBAC at, for example, about 200 Hz. The BSCU could maintain low magnitude 'heart beat' data that changes less often, for example, 40 Hz whether or not the anti-skid/anti-lock input is available. The anti-skid/anti-lock system, when activated, could utilize the entire 200 Hz transmission bandwidth to transmit potential new values with-in each of the update duration. The force update rate detection system will recognize a 40 Hz update rate when the anti-skid command is not active—by way of detecting a 'heart beat' signal updated at a lesser rate, and recognize a 200 Hz update rate when the anti-skid/anti-lock is active. The force update rate detection system could thus establish a form of "handshake" protocol among cascaded components.

As used herein, the meaning of the term "non-transitory computer-readable medium" should be construed to exclude only those types of transitory computer-readable media which were found in *In re Nuijten*, 500 F.3d 1346 (Fed. Cir. 2007) to fall outside the scope of patentable subject matter under 35 U.S.C. §101, so long as and to the extent *In re Nuijten* remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of force command update rate detection comprising:
    receiving, by an electrical brake actuation controller, a brake actuation instruction from a brake and steering control unit, wherein the electrical brake actuation controller comprises a force command update rate detector comprising a variation detector and a similarity detector;
    determining, by the force command update rate detector, an update rate of the brake actuation instruction, wherein the determining comprises:
        collecting samples, by the variation detector, of the brake actuation instruction,
    wherein a number of samples is equal to a dissimilarity window;
        determining, by the variation detector, variations between pairs of samples of the brake actuation instruction in response to the collecting samples;
        counting, by the variation detector, a number of variations;
        computing the update rate of the brake actuation instruction in response to the counting; and
        outputting an update rate determination in response to the computing; and
    transmitting, by the electrical brake actuation controller, an instruction comprising a force command having a force command update rate to an electric brake actuator in response to the determining.

2. The method of claim 1, wherein the force command comprises a brake release command.

3. The method of claim 2, wherein the electrical brake actuation controller processes the brake actuation instruction at an electrical brake actuation controller processing rate that is faster than the force command update rate.

4. The method of claim 1, wherein the force command comprises a pilot braking command.

5. The method of claim 1, wherein the force command comprises an anti-skid braking command.

6. The method of claim 1, further comprising providing, by the electrical brake actuation controller, the force command to the electric brake actuator in response to the outputting.

7. The method of claim 6, wherein the force command update rate comprises a rate equal to the update rate determination.

8. A method of force command update rate detection comprising:
    receiving, by an electrical brake actuation controller, a brake actuation instruction from a brake and steering control unit, wherein the electrical brake actuation controller comprises a force command update rate detector comprising a variation detector and a similarity detector;
    determining, by the force command update rate detector, an update rate of the brake actuation instruction, wherein the determining comprises:

collecting samples, by the similarity detector, of the brake actuation instruction, wherein a number of samples is equal to a similarity window;

determining, by the similarity detector, equivalences between pairs of the samples of the brake actuation instruction in response to the collecting samples;

counting, by the similarity detector, a number of the equivalences;

computing the update rate of the brake actuation instruction in response to the counting; and outputting an update rate determination in response to the computing; and transmitting, by the electrical brake actuation controller, an instruction comprising a force command having a force command update rate to an electric brake actuator in response to the determining.

9. The method of claim 8, further comprising providing, by the electrical brake actuation controller, the brake actuation instruction to the electric brake actuator in response to the outputting.

10. The method of claim 9, wherein the force command update rate has a rate equal to the update rate determination.

11. The method of claim 8, wherein the force command comprises a brake release command.

12. The method of claim 11, wherein the electrical brake actuation controller processes the brake actuation instruction at an electrical brake actuation controller processing rate that is faster than the force command update rate.

13. The method of claim 8, wherein the force command comprises a pilot braking command.

14. The method of claim 8, wherein the force command comprises an anti-skid braking command.

15. A force command update rate detector comprising:
a variation detector in logical communication with a signal input; and
a similarity detector in logical communication with the signal input and connected in parallel with the variation detector, wherein the variation detector provides an output command indication comprising a first indication in response to the signal input receiving a first signal having a first update rate, and wherein the similarity detector provides the output command indication comprising a second indication in response to the signal input receiving a second signal having a second update rate.

16. The force command update rate detector according to claim 15, wherein the variation detector comprises:
a dissimilarity window width input including a dissimilarity window width,
a dissimilarity count input including a dissimilarity count,
a first counter, whereby the variation detector is reset in response to the dissimilarity window width elapsing;
a second counter, whereby the variation detector determines that a number of samples of a signal at the signal input comprising dissimilar values is equal to or greater than the dissimilarity count;
wherein the second counter provides the output command indication comprising the first indication in response to the determining.

17. The force command update rate detector according to claim 15, wherein the similarity detector comprises:
a similarity window width input including a similarity window width;
a similarity count input including a similarity count;
a first counter, whereby the similarity detector is reset in response to the similarity window width elapsing;
a second counter, whereby the similarity detector determines that a number of samples of a signal at the signal input comprising equal values is equal to or greater than the similarity count,
wherein the second counter provides the output command indication comprising the second indication in response to the determining.

* * * * *